United States Patent
Gulcu

(10) Patent No.: US 6,981,142 B1
(45) Date of Patent: Dec. 27, 2005

(54) ELECTRONIC ACCESS CONTROL SYSTEM AND METHOD

(75) Inventor: Ceki Gulcu, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/647,284

(22) PCT Filed: Jan. 12, 2000

(86) PCT No.: PCT/IB00/00032

§ 371 (c)(1),
(2), (4) Date: Sep. 27, 2000

(87) PCT Pub. No.: WO00/45016

PCT Pub. Date: Aug. 3, 2000

(30) Foreign Application Priority Data

Jan. 28, 1999 (EP) .................................. 99101806

(51) Int. Cl.[7] .................. H04L 9/00; G05B 23/00; G05B 19/00
(52) U.S. Cl. .................. 713/165; 713/172; 340/5.2; 340/5.5; 340/5.6
(58) Field of Search .................. 713/168, 155, 713/161, 165, 172; 109/44, 30, 50; 340/426, 340/5.2, 5.5–5.6; 70/262–263; 235/381–382

(56) References Cited

U.S. PATENT DOCUMENTS

| | | | |
|---|---|---|---|
| 4,677,284 A * | 6/1987 | Genest | 235/487 |
| 5,204,663 A * | 4/1993 | Lee | 340/5.28 |
| 5,397,884 A | 3/1995 | Saliga | 235/382.5 |
| 5,485,628 A | 1/1996 | Clements | |
| 5,506,575 A * | 4/1996 | Ormos | 340/5.23 |
| 5,602,536 A * | 2/1997 | Henderson et al. | 340/5.23 |
| 5,629,981 A * | 5/1997 | Nerlikar | 713/168 |
| 5,709,114 A * | 1/1998 | Dawson et al. | 70/278.2 |
| 5,815,557 A * | 9/1998 | Larson | 340/5.64 |
| 6,005,487 A * | 12/1999 | Hyatt et al. | 340/5.65 |
| 6,064,316 A * | 5/2000 | Glick et al. | 340/5.65 |
| 6,097,306 A * | 8/2000 | Leon et al. | 340/5.1 |
| 6,212,635 B1 * | 4/2001 | Reardon | 713/165 |
| 6,318,137 B1 * | 11/2001 | Chaum | 70/278.3 |
| 6,347,375 B1 * | 2/2002 | Reinert et al. | 713/200 |
| 6,552,650 B1 * | 4/2003 | Gokcebay et al. | 340/5.65 |
| 6,842,105 B1 * | 1/2005 | Henderson et al. | 340/5.73 |

FOREIGN PATENT DOCUMENTS

| | | | | |
|---|---|---|---|---|
| EP | 0 618 550 | 10/1994 | | G07C 9/00 |
| FR | 2 597 142 | 4/1987 | | E05B 49/00 |
| FR | 2 760 281 | 3/1997 | | G07C 9/00 |
| JP | 01-299972 | 12/1989 | | |
| JP | 03-275879 | 12/1991 | | |
| JP | 07-233663 | 9/1995 | | |
| JP | 2000-509451 | 7/2000 | | |

* cited by examiner

*Primary Examiner*—Hosuk Song
*Assistant Examiner*—Linh LD Son
(74) *Attorney, Agent, or Firm*—Ohlandt, Greeley, Ruggiero & Perle, L.L.P.; Rafael Perez-Pineiro

(57) ABSTRACT

Disclosed is a new and flexible approach for managing physical security in an electronic lock-and-key system. The novel approach does away with cabling or other direct connecting between locks and a system management center. The (physical) keys serve to disseminate access control and other information within the system in a snowball-like way, using an adapted, but simple networking protocol. Whenever appropriate, cryptographic schemes are applied to protect the system.

10 Claims, 1 Drawing Sheet

ELECTRONIC ACCESS CONTROL SYSTEM AND METHOD

TECHNICAL FIELD

Figure 1:
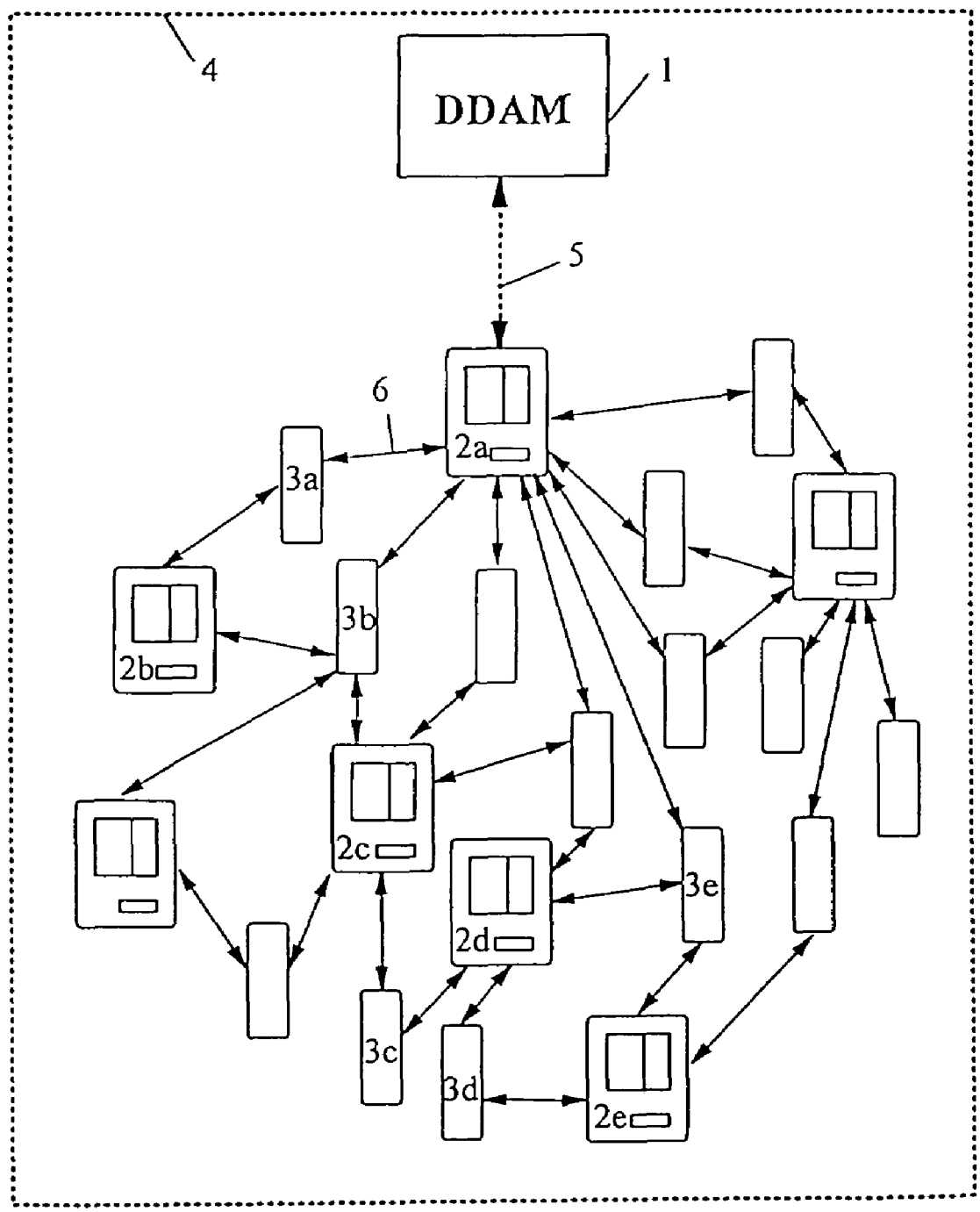

This invention relates to an electronic lock-and-key access control system and discloses a novel and very flexible approach for managing the physical security of such a system. Such systems are extensively used in industry, in the hotel business, in banks, and in other environments where it is desirable to control or restrict access to rooms or equipment. Many of these systems are using cards, sometimes even smartcards with built-in processing power. Such cards are generally magnetically or in other ways readable by a reader associated with each lock. To enable or block the use of certain keys, to restrict the access timely, or to change the security system in any other way, access information or messages have to be transmitted to—and sometimes from—the locks. This is often done via a cabling system connecting the locks to a central security management device, but other transmission means are also used. However, the more or less direct connection between management device and locks is characteristic for prior art approaches.

BACKGROUND

Each and every one of us relies daily on keys to gain access to our cars, homes, and offices, to snap open the lock on our bicycles, or unlatch our postal boxes. Hence, keys are undeniably an integral part of modern society. Today, most of these keys are still of the mechanical type, as are the associated locks.

Although widely spread, these traditional, mechanical keys suffer from a number of shortcomings. First, in case of security breach, such as loss of a key, unauthorized duplication, or deprecation of trust assumptions, the lock must be replaced. Second, a key is valid as long as the corresponding lock remains in place. For example, once an access right is given to an individual by handing him/her a key, that right cannot be revoked unless the key is returned or the lock changed. As a consequence of these limitations, traditional lock-and-key systems do not allow to institute a time-based access policy, for example allowing access during office hours only, or protecting certain areas during certain times of the day. In the many environments where such requirements exist, traditional lock-and-key systems are no more sufficient.

Clearly, traditional keys offer only inflexible and rather limited management possibilities, but they are widely available, very reliable, and reasonably cheap. Still, replacement solutions with higher flexibility and extensive management possibilities have been invented and found their way to the market. For example in hotels and enterprises, electronic locks and appropriate electronic keys are widely used, providing very flexible and rather quick management of access rights.

An example of a system using smartcards of different kinds is shown in Lee U.S. Pat. No. 5,204,663 to Applied Systems Institute, Inc., which discloses an access control system with integrated-circuit cards, i.e. smartcards, some of which have a memory to store key access information and so-called transaction information. Whereas the key access information here relates to the immediate use of the key, e.g. the present access code of the card, relates the transaction information to other activity, e.g. a log of previous use of the lock as it is recorded in the lock's memory, specific new access codes to be uploaded into specific locks, or a log of failed entry attempts of the card user. Some of this transaction information is transferred from the lock into the card's memory, some from the card into the lock, and some just stored on the card for later readout.

One example of a lock which may be used in such an environment is the SaFixx smartlock, described in the Internet on http://acola.com, a lock made by ACOLA GmbH in Villingen-Schwenningen, Germany. The Safixx smartlock even exhibits some specific properties (discussed below) that may make it quite useful in connection with the present invention.

Other examples can be found in the literature. All of them have one disadvantage. They require a kind of "direct" access to each and every electronic lock in the system, be it that the locks are connected by a cabling or radio network to a management center, or that one has to walk up to each lock and "reprogram" it manually or electronically, as with the Safixx smartlock mentioned above or as with the system disclosed in the above-cited Lee U.S. Pat. No. 5,204,663. Either of these methods is burdensome: A network of cables to all locks in a hotel or an plant will usually cost more than the electronic locks themselves, a radio transmission system requires a transceiver and power in each and every lock and may thus be even more expensive (and failure-prone) than a cabling network, and walking to each and every lock may be simply impossible in a reasonable time frame.

Here, the invention intends to provide solutions. To summarize, it is an object of the present invention to avoid the above-described disadvantages and devise a reliable and flexible electronic lock-and-key system which has no need for "direct" (in the above sense) connections between locks and an associated management center controlling security within the system.

Another object is to simplify expansion of a given system when installing additional locks or other access or security devices, or to facilitate changes within a given system by installing new locks and/or exchanging existing ones.

A further object is to devise an architecture that allows a practically unlimited flexibility with regard to protocol changes or security updates between management center and locks. Such updates are necessary after a "successful" attack, or after card keys have been lost or stolen, or when security aspects of the system are changed, e.g. certain physical areas in a plant or lab become "restricted access" areas.

A specific object is to devise an architecture which allows an "on-the-fly" expansion of such a system.

The Invention

In essence, the novel approach according to the invention concentrates on using means, especially hardware, already existing in a usual electronic lock-and-key system. Access control and other information which need to be updated or changed is disseminated through existing smartcard or similar keys and the existing locks without any need for a connection between the latter and a central or distributed management center controlling this information. For this, a suitably adapted networking protocol is being used and, wherever appropriate, cryptography to protect the system against possible attacks.

In the following, the primary innovation, namely the propagation of access control information in cable-free environments, is discussed in more detail. It is also described how cost effective and easily manageable electronic locks can be generally implemented. Thereafter, attacks and implied security assumptions of such a system are discussed.

Contrary to most current electronic security systems, the system disclosed in this document does not require fixed network connectivity of any kind, be it wire-based or radio-based. Consequently, cost associated with cabling or radio transmission equipment is eliminated. Experience shows that this cost can be an order of magnitude higher than the cost of the locks themselves. It should be mentioned here that in this document the term "key" does not designate the traditional metallic key but rather any arbitrary carrier of information, e.g. smartcards or IBM's JavaCard. Similarly, the term "lock" will usually designate an electronic lock.

Instead of the locks receiving electrical power via a fixed cable, the required energy to operate the lock can be delivered either through the user's key or through an battery embedded in the lock or door. Clearly, in such a construction, power consumption must be kept to a strict minimum so that batteries last at least a few years. Electronic locks exhibiting the desired physical properties such as tamper resistance, operational reliability and long battery life, already exist on the market. The above mentioned SaFixx smartlock is an example of a lock exhibiting these properties. The present invention emphasizes the logical aspects of cable-free lock constructions, not so much the physical design.

DESCRIPTION OF AN EMBODIMENT

In the following, the invention will be described in more detail in connection with a drawing which shows a block diagram of a typical access control system according to the invention, in particular the principle of message or information propagation in such a system.

As shown in the Figure, a Door Domain Access Manager (DDAM) 1 is the entity holding authority over an ensemble of locks 2. For the sake of simplicity, only some of them carry reference numbers 2a, 2b, etc. DDAM 1 plus the set of locks 2 constitute an administrative domain 4. It is assumed that DDAM 1 is composed of a single entity, as shown. This restriction may be removed by applying threshold signatures as described by Douglas R. Stinson in "Cryptography —Theory and Practice", CRC Press, 1996, and some more or less straightforward extensions to the communication protocol presented in this document.

Also shown is a plurality of keys 3, of which just a few have reference numbers 3a, 3b, etc., again to keep the drawing clean.

Each lock 2, usually associated with a door, as mentioned above, has a key (or card) reader of conventional type and a memory. The memory is organized to store two different sets of data or information, one first set consisting of one or more tokens (the number depends on the overall organization of the lock-and-key system), the second set comprising a message of so-called designated data, i.e. data designated for other keys or locks. The latter is a transient message which is only held for some time in the lock's transient memory part.

The keys 3 are of a very similar design as far as their memory is concerned. Their memory is also able to store two different sets of data or information. One first set consists again of one or more tokens (the number depending on the overall design of the lock-and-key system) and may be called a "key-activating" set. The second set consists again of a message of designated data, i.e. a transient message designated for other keys or locks, which message is held only for some time in the key's transient memory part. Simply said is this latter part of the key's memory the information transport path within the whole system.

Looking at the Figure, one recognizes that, using the keys as transport means for the designated data, there is usually a plurality of ways to each lock and key. A rather simple example shall clarify this.

Assume DDAM 1 issues a message for lock 2e (at the bottom), e.g. that a certain key, say key 3d, is not allowed to enter the room behind the door of lock 2e. This message designated for lock 2e is "entered" into the network via line 5, which latter may be a cable connection, any mobile data carrier, a wireless connection of any kind, etc. As soon as lock 2a has received the message, each and every key used at this lock 2a receives and stores in its transient memory part a copy of said message. Key 3a will transport it to lock 2b, key 3b will read and store it, transporting it to lock 2c (and others), from there, the set will travel via key 3c, lock 2d, key 3d and/or keys 3e to its designation, lock 2e. Note that even key 3d, who would be negatively affected by the transported message, may convey it to the designated lock 2e.

As soon as lock 2e receives the designated message, it issues an acknowledgement which now travels back through the system in the same fashion as the original message until it reaches DDAM 1, which closes the loop. The acknowledgement, since it recognizably refers to the message, erases the still stored message in the both the keys and the locks through which it travels. Again, this is the overall function of the electronic lock system according to the invention in great simplification; details will be apparent from the subsequent description, which also addresses the theory behind some solutions.

As mentioned above, a user is granted access through a lock 2 (or door, which terms are used interchangeably in this document) only if his/her key exhibits an appropriate token issued by the DDAM. All tokens are minted with an expiration date. The DDAM may choose to revoke the access rights of any user at any time.

Keys are built so that they may hold multiple tokens as well as other types of data. Whether tokens are based on public key cryptography, shared secrets or some other type of security primitive is irrelevant at this stage.

In addition to storage capacity, doors may have computational capabilities allowing them to process tokens issued by the DDAM. The relation between DDAM and doors/locks 2 is that of master and slave. It is the DDAM's reserved prerogative to determine who may traverse which door and until what time and date. Consequently, the doors within an administrative domain 4 must completely trust the DDAM and blindly obey its orders. However, doors do not honor orders given by a DDAM outside their domain. There is no direct cabling linking the doors among themselves nor with the DDAM required. This mandates the alternative communication mechanism addressed above so that the DDAM and the locks can still exchange information. But note that the possibility of doors exchanging messages with one another is not necessarily precluded; also, there may be single selective "direct" connections between the DDAM and one or more selected locks.

Suitability Considerations

As users are required to present a valid token to access a door (by construction), the dissemination of positive access rights is not an issue. The DDAM can pass a token to a given user through a (secure) terminal or the token can simply be dropped at a door, e.g. lock 2a, until the user unwittingly picks it up. Renewing tokens that are about to expire can be accomplished in a similar fashion.

On the other hand, how can one ensure that a negative token (i.e. access revocation) reaches the relevant lock without excessive delay?

The solution for this problem is particularly appropriate in cases where all users happen to go through certain central doors, such as a building entrance, an elevator, or garage barriers. In another favorable scenario which is typical of business environments, rapid propagation of information is guaranteed by workers who arrive at work in the morning or by the maintenance/security personnel who frequently go through many doors. Looking at the Figure, door/lock 2a may be particularly suitable for that purpose.

As shall be explained later, if control information does not reach the destination node, i.e. the destined lock 2, the source, usually the DDAM, will not receive an acknowledgment. The DDAM can thus detect failure. It follows that in case there is no privileged central door and the target door is infrequently visited, the operator of the DDAM is alerted and he/she can always walk to the door in question. Critical doors requiring immediate information propagation could also be connected to the DDAM with a dedicated cable or by other "direct" means.

Network Model

As explained, to make certain that information is propagated in a timely fashion, user's physical keys 3 carry messages to and from between locks 2 and DDAM 1. Moreover, locks 2 act as a temporary repositories for messages designated for other locks. Doors and/or locks are modeled as nodes in a network and users as channels linking these nodes. For example, a temporary channel between lock 2a and lock 2b is established when a user travels through them, using key 3a. To improve connectivity, intermediary locks and user keys must act as repositories. As explained above, a user Alice may pick up a message from door 2a and leave it at door 2b. Then, user Bob with key 3e happens to go through door 2a and carries the message to its final destination, say door 2e.

More generally, both keys and doors contain a snapshot view of all current pending traffic, that is, all sent but not yet acknowledged packets. This, for any destination within the administrative domain. When a key is inserted in a door, both key and door/lock update their respective view of the network. Naturally, this update need not be interactive as it can be efficiently performed off-line. This way the user shall not be delayed waiting for the key and the lock to synchronize when going through a door. Off-line updates mandate that each entity possesses its own power source.

The Networking Protocol

The well-known TCP/IP protocol, as described by W. Richard Stevens in "TCP/IP illustrated", Vol. I, Addison Wesley, 1994, serves as a basis and is simplified and somewhat optimized for the novel application. In an abstract sense, the problem can be stated as the building of a transmission control protocol (e.g. TCP) on top of a high-loss, varying-topology LAN.

First, it is assumed that each node of the network, that is a key, a door/lock or the DDAM, can be addressed individually. Hereafter, the term node may refer to a door/lock, a key, or the DDAM. This can be accomplished by using the addressing scheme of any networking layer protocol, in particular the Internet Protocol, as described by J. Postel: "Internet Protocol" in the publication of the Internet Engineering Task Force, September 1981, RFC 791.

As mentioned earlier, each node is responsible for propagating messages or packets, even if it is not the intended recipient, until the packet is acknowledged, at which time the packet is erased from the node's memory.

Like in TCP, described by J. Postel: "Transmission Control Protocol" in Internet Engineering Task Force, September 1981. RFC 793, each packet requiring acknowledgment is sent with a monotonically increasing sequence number. TCP deals with packet fragmentation caused by the IP layer, in the present homogeneous setting, packets are not liable to be fragmented. Hence the sequence numbers correspond to packets and not the number of bytes sent. This is unlike TCP, but has the advantage of being both simpler and more space efficient.

Once a message is received, the recipient issues an acknowledgment which is sent back to the sender, acknowledging the received packet. This acknowledgment consists of the usual addressing information and at least two other fields: a cumulative sequence number, denoted n, and a bit field of w bits length.

The actual value of n indicates that packets bearing a lower sequence number (inclusive) have been correctly received without gaps. The bit field provides information on out-of-order packets. The bit field loosely corresponds to the so-called "sliding window" of TCP.

As in TCP, packets outside of the sliding window, that is packets bearing a sequence number outside the range n+1 to n+w, are dropped. However, if an incoming packet completes to a sequence with no gaps, then n is incremented and an acknowledgment sent back to the source. Each packet received out of order but within the sliding window is tallied by turning on a corresponding bit in the bit field.

Thus, after the acknowledgment propagates back the sender of the packet, the source can selectively retransmit packets that have been lost. Packets that have correctly arrived, albeit out of order, need not be retransmitted. Also, packets that have been selectively acknowledged are dropped by intermediary nodes regardless of whether the source has received the acknowledgment or not, thus preserving precious memory space at each intermediary node.

It is important to note that acknowledgments presented here have an absolute ordering much like cumulative acknowledgments. Thus, they may be compared with one another. Consequently, only the newest acknowledgment need to be stored by the intermediate nodes as the newest acknowledgment overrides all previous ones.

Window Size

It is reasonable to assume that in most cases the frequency of revocation messages sent to a specific door or lock is low. Thus, very small window sizes (say 2) may amply suffice to satisfy the needs of even large organizations.

However, for exceptional cases, the window size can be increased at will. This can be accomplished by the DDAM sending out a broadcast message instructing all doors to adjust the window size for a given source/destination pair. Broadcast messages bear a fixed destination address recognized by all.

Clocking Information

The DDAM could keep time on behalf of all other entities in the administrative domain. The DDAM sends timing updates as frequently as it can (i.e. each time it has contact with a user or door). As with acknowledgments, only the latest clock information need be stored by intermediate nodes, again saving precious memory space. In this way, there is no need for doors to have individual clocks.

Cryptographic Aspects

The cryptographic representation of a token can have overreaching effects on security management. The security implications of a secret key based architecture shall first be discussed. Next, the implications of a public key architecture are described.

Shared Secret

Tokens can be based on a shared secret between the DDAM and the locks. Let us assume the DDAM and lock $l_j$ share the secret $s_j$. To grant user $u_i$ access through $l_j$, the DDAM would authenticate the access string $a_{ij}$, where $$a_{ij}=\text{"Let } u_i \text{ through } l_j \text{ until Jan. 1, 2001"}. \quad (1)$$

The authentication could be based on any secure keyed message authentication function, such as HMAC as described by R. Canetti et al in "HMAC: Keyed-Hashing for Message Authentication", Engineering Task Force, February 1997, RFC 2104. We have $$t_{ij}=HMAC(s_j,a_{ij})\Pi a_{ij},$$

were $t_{ij}$ is the access token and $\Pi$ denotes string concatenation. Note that tokens could have other representations based on different types of authentication. User $u_i$ would be granted access through $l_j$ by presenting the token $t_{ij}$ until 1 Jan. 2001.

As in any digital representation of information, a token may be easily duplicated. In the shared secret setting, if a token can be "seen" by a rogue lock or any other unauthorized party, then the token has been effectively stolen. Indeed, the attacker could present the stolen token to the corresponding lock and obtain illegitimate access.

To mitigate the menace, security must be augmented by other means. For example, one may impose a universally unique serial number to be burned into each physical key, i.e. smartcard or the like, and issue tokens for a particular serial number. This may provide enough security to repel unsophisticated attackers. However, a determined adversary may print his/her own physical key with fake serial numbers.

For high security applications, it is crucial that the physical key allows only selective access to information. As a physical key is inserted in a lock, it should be able to verify whether the user has a specific token allowing passage through that lock. However, the particular lock should not be able to read tokens (on the key) relevant to other locks, possibly in other administrative domains. But even if a physical key allows selective access to information, lock $l_x$ can pretend to be lock $l_y$ and steal the token (for $l_y$).

The token duplication attack constitutes a severe threat, particularly if electronic locks become truly ubiquitous. Universal deployment means that physical keys will be used in mutually untrusting domains.

One can protect against this attack by requiring the lock to identify itself to the physical key; only then will the key reveal the token for the identified lock.

If this identification is based on a shared secret between the doors and the users, the number of shared secrets will explode for even medium sized organizations because each lock will have to share a secret with each user that goes through it. Thus, lock-user shared secrets may be suitable for small settings only.

Alternatively, a KryptoKnight type third party authentication technique may be used as described by P. Janson et al "Scalability and flexibility in authentication services: The KryptoKnight Approach" in IEEE INFOCOM '97, Tokyo, Japan, April 1997, and R. Bird et al "The KryptoKnight family of light-weight protocols for authentication and key distribution" in IEEE Transactions on Networking, 1995. Also, a Kerberos type third party authentication techniques could be employed, described by J. Kohl et al. "The Kerberos Network Authentication Service", V5, Internet Engineering Task Force, September 1993, RFC 1510 and by B. Clifford Neuman et al in "Kerberos: An authentication service for computer networks", IEEE Communications Magazine, 32(9): pp. 33–38, September 1994. In such a scheme, all users and locks would share a secret with the DDAM. Since the DDAM shares a secret with all nodes, it can convince any node of the identity of another.

Let $s_i$ represent the long term secret that user $u_i$ shares with the DDAM, and $s_j$ the secret that lock $l_j$ shares with the DDAM. The DDAM would randomly choose an encryption key k. The access string $a_{ij}$ would become:

$$a_{ij}=\text{"Let through } l_j \text{ user knowing k, until Jan. 1, 2001"} \quad (2)$$

The DDAM would issue the ticket $T_{ij}$ defined as $$T_{ij}=\{HMAC(s_j,a_{ij})\Pi a_{ij}\}s_j\Pi\{k\}s_i \quad (3)$$

where $\{m\}_x$ denotes symmetric encryption of message m using encryption key x and $a_{ij}$ is given by equation (2).

User $u_i$ would strip the encryption $\{k\}s$ from the ticket $T_{ij}$ to retrieve the token $t_{ij}$. It would then obtain k from $\{k\}s_i$ by decrypting it with its long term shared encryption key with the DDAM, that is $s_i$.

To pass tough door $I_j$, the user would present $t_{ij}$. The lock $I_j$ would retrieve the encryption key k contained in $a_{ij}$ by decrypting $t_{ij}$ with its long term shared secret key, $s_j$. The door would then challenge the user for the knowledge of encryption key k. If the response checks with the issued challenge, then the user would be granted access.

Note that the DDAM has to precompute $T_{ij}$ for given message $a_{ij}$ and given nodes $u_i$ and $l_j$. Remember that there is no direct channel (a connecting cable or the like) to the DDAM. Consequently, the Kerberos setting is unsuitable for situations where either the message being authenticated, or the intervening parties, are not known in advance. This is an important limitation if the application requires that disruption attacks be thwarted.

The verbosity of the access string $a_{ij}$ should indicate to the reader that the protocol just described is not optimized, but is essentially intended for illustration purposes.

Public Key Setting

An alternative setting would have the DDAM and all users within the domain hold a public/secret key pair. Each lock within an administrative domain would be installed with the DDAM's public key. The DDAM would then certify the public keys of all users within its administrative domain.

The access token for user $u_i$ through lock $l_i$ would be the DDAM's signature on the message $a_{ij}$, as defined in equation (1). Whenever a user wishes to cross a door, it would present the token to the lock, which would verify DDAM's signature. To prevent impersonation, the door would require the user to prove knowledge of the secret key corresponding to the user's (DDAM certified) public key.

This proof can be based on any challenge response type protocol, such as described by 10 by C. P. Schnorr in "Efficient signature generation by smart cards", Journal of Cryptology, 4(3): pp. 161–174, 1991, or by Uriel Feige et al in "Zero-knowledge proofs of identity", Journal of Cryptology: the journal of the International Association for Cryptologic Research, 1(2): pp. 77–94, 1988, or by Jean-Jacques Quisquater and Louis Guillou in "A practical zero-knowledge protocol fitted to security microprocessor minimizing both transmission and memory" in Christoph G. Gunther, editor, *Advances in Cryptology—EUROCRYPT88*, Volume 330 of Lecture Notes in Computer Science, pp. 123–128, Springer-Verlag, May 1988.

The solution just presented separates the user's credentials from his/her public key. Thus, Alice's credentials may be transported to the relevant door without Alice having to intervene. To benefit from new credentials, Alice just has to prove her identity. Alice does not have to obtain a new secret from the DDAM nor change her public key. The new credentials are transparent to Alice. On the other hand, if one had tied each of Alice's credentials to a corresponding secret held by Alice, then Alice would have to communicate to the DDAM on a secure channel each time her credentials changed.

For example, in the Quisquater-Guillou (above) protocol, the DDAM would send Alice her new credentials, denoted by the string J, and a corresponding secret B, such that $$JB^v = 1 \bmod n \qquad (4)$$

where n is a public modulus and v is a public exponent. Let $\phi$ denote Euler's $\phi$ function. Only the DDAM knows the inverse of v mod $\phi(n)$, and hence can efficiently compute B, verifying equation (4).

To allow the access rights granted by J, the relevant lock would challenge Alice with a random number and check that Alice knows the secret corresponding to J, that is B. As usual, Alice does not reveal B as a result of the challenger-response protocol. Note that the secret B has to be sent by the DDAM to Alice on a secure channel.

False Acknowledgment Injections

In case an attacker is able to inject an acknowledgment message bearing a high sequence number, all intermediary hops will drop packets bearing a lower sequence number. Although this disruption attack will eventually be detected, it will momentarily prevent all communications between the DDAM and the locks.

In a variant attack, assuming that newer messages have higher priority, an attacker may flood locks by sending fake packets bearing high sequence numbers. The intermediate nodes will regard such packets as being newer and drop lower sequence numbered but genuine messages. This will also disrupt communications.

High security applications, especially those slated for universal deployment, mandate that all messages, including acknowledgments, be authenticated. Thus, all nodes, that is all doors/locks, users and the DDAM would have a public key certified by the DDAM.

The Kerberos type shared secret setting does not allow for messages to be authenticated for two dynamically chosen parties. Thus disruption attacks can only be prevented in the public key setting.

From the above discussion of the security implications of shared key versus public key based architecture it should have become clear that, because of the key explosion problem, a shared key architecture is suitable only for low security applications or for small scale deployment, whereas high security applications or universal deployment both mandate public key cryptography.

It should also have become clear that the invented flexible architecture for managing physical security using electronic locks and physical keys described hereinbefore does not require a permanent channel between the locks and a security management center. The question of timely propagation of access control information raised by the missing permanent connection is solved by having users act as transmission channels and locks as message repositories.

Those skilled in the art will be able to implement the above-described cable-less lock-and-key access control system as is or with various modifications and adaptations without departing from the scope and spirit of this invention. Other embodiments will be apparent to persons skilled in the art on the basis of the above specification and practice disclosed herein, the scope of the invention being indicated by the following claims.

What is claimed is:

1. A method for propagating information in an electronic lock-and-key system, said method comprising:
   inserting an original message to be propagated to an n-th lock or key into a memory of a first key or a first lock, respectively,
   copying, on any use of said first key or said first lock, said original message into a memory of a second lock or key, respectively, but remains in said first key's or first lock's, respectively, memory,
   copying, on any subsequent use of said first and second key and said first and second lock, said original message into a memory of a next lock or key, respectively, but remains in the memories of said previously used locks and keys, respectively,
   propagating said original message until it reaches its destination, and
   producing a confirmation message in the n-th lock or key, thereby acknowledging reception of said original message which confirmation message serves to control erasing of the copies of the original message in the memories of the locks and keys.

2. The method for propagating information according to claim 1, further comprising: propagating the confirmation message through the system in the same way as the original message, when said confirmation message is received by a lock or key whose memory still contains a copy of said original message, erasing said original message.

3. The method for propagating information according to claim 1, further comprising: selectively or universally erasing copies of said original message after a selective or universal time-out.

4. The method for propagating information according to claim 1, wherein original messages and confirmation messages, especially those concerning the same lock or key, are ordered, in particular sequentially numbered.

5. The method for propagating information according to claim 4, further comprising: erasing any message of lower order, in particular with a lower sequence number, in the respective memory when a message of higher order, in particular with a higher sequence number, is received by a lock or key during propagation.

6. The method for propagating information according to claim 1, wherein original messages and confirmation messages are fully or partly encrypted, in particular using a shared key encryption scheme and a public key encryption scheme.

7. A computer readable program embodied in a storage media including computer readable program instructions for controlling propagation of information in an electronic lock-and- key system, said storage media comprising:
   computer readable program instructions to store an original message to be propagated to an n-th lock or key in a memory of a first lock;
   computer readable program instructions to control when a first key is used with said first lock, said original message is copied into said first key's memory, but remains in said first lock's memory;

computer readable program instructions to control when a first key is used with a second lock, said original message is copied into said second lock's memory, but remains in said first key's memory;

computer readable program instructions to control when a second key is used with said second lock, said original message is copied into said second key's memory, said original message remains in said second lock's memory until said original message is propagated to said n-th lock or key; and computer readable program instructions to control said n-th lock or key to produce a confirmation message acknowledging reception of said original message, said confirmation message serves to control erasing of the original message in the memories of said locks and keys.

8. The storage media of claim 7, further comprising computer readable program instructions to control said confirmation message is propagated through said system the same as said original message.

9. A computer readable program embodied in a storage media including computer readable program instructions for controlling propagation of information in an electronic lock- and- key system, said storage media comprising:

computer readable program instructions to store an original message to be propagated to an n-th lock or key in a memory of a first lock;

computer readable program instructions to control when a first key is used with said first lock, said original message is copied into said first key's memory but remains in said first lock's memory;

computer readable program instructions to control when a first key is used with a second lock, said original message is copied into said second lock's memory, but remains in said first key's memory;

computer readable program instructions to control when a second key is used with said second lock said original message is copied into said second key's memory said original message remains in said second lock's memory until said original message is propagated to said n-th lock or key:

computer readable program instruction for ordering said original messages and confirmation messages; and computer readable program instruction for erasing a message of a lower order when a message of higher order is received by said lock or key during propagation.

10. A computer readable program embodied in a storage media including computer readable program instructions for controlling propagation of information in an electronic lock- and- key system, said storage media comprising:

computer readable program instructions to store an original message to be propagated to an n-th lock or key in a memory of a first lock;

computer readable program instructions to control when a first key is used with said first lock, said original message is copied into said first key's memory, but remains in said first locks memory;

computer readable program instructions to control when a first key is used with a second lock, said original message is copied into said second lock's memory, but remains in said first key's memory;

computer readable program instructions to control when a second key is used with said second lock, said original message is copied into said second key's memory, said original message remains in said second lock's memory until said original message is propagated to said n-th lock or key; and computer readable program instruction for encrypting original messages and confirmation messages using an encryption scheme.

* * * * *